United States Patent [19]

Miyawaki

[11] Patent Number: 4,674,363
[45] Date of Patent: Jun. 23, 1987

[54] SYSTEM FOR CONTROLLING THE PRESSURE OF OIL IN A SYSTEM FOR A CONTINUOUSLY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 885,990

[22] Filed: Jul. 15, 1986

[30] Foreign Application Priority Data

Aug. 30, 1985 [JP] Japan .................. 60-191045

[51] Int. Cl.⁴ ............... B60K 41/12; B60K 41/10; B60K 41/18
[52] U.S. Cl. .................. 74/866; 364/424.1; 474/18
[58] Field of Search ............ 74/866; 474/18; 364/424.1

[56] References Cited

U.S. PATENT DOCUMENTS

| | | | |
|---|---|---|---|
| 4,369,675 | 1/1983 | van Deursen | 74/864 |
| 4,403,975 | 9/1983 | Rattunde | 474/18 |
| 4,462,275 | 7/1984 | Mohl et al. | 74/866 |
| 4,462,277 | 7/1984 | Miki et al. | 74/867 |
| 4,466,521 | 8/1984 | Hattori et al. | 74/866 X |
| 4,543,077 | 9/1985 | Yamamuro et al. | 474/18 X |
| 4,545,265 | 10/1985 | Abo et al. | 74/868 |
| 4,551,119 | 11/1985 | Sugaya et al. | 474/18 X |
| 4,561,327 | 12/1985 | Niwa et al. | 364/424.1 |
| 4,589,302 | 5/1986 | Oda et al. | 74/866 |
| 4,601,680 | 7/1986 | Tokoro et al. | 474/11 |
| 4,612,828 | 9/1986 | Ide et al. | 74/866 |

FOREIGN PATENT DOCUMENTS 57-161347 10/1982 Japan .

Primary Examiner—Allan D. Herrmann
Assistant Examiner—D. Wright
Attorney, Agent, or Firm—Martin A. Farber

[57] ABSTRACT

A control system for a continuously variable transmission has a line pressure control valve having ports and a spool for controlling the line pressure of oil supplied to a cylinder of a pulley device to change the transmission ratio. The line pressure control valve has chambers. When the transmission ratio reaches a maximum value after disengagement of a clutch, a line pressure reducing signal generates. The signal is applied to the line pressure control valve to shift the spool thereof, so that the line pressure is reduced to a minimum value. By controlling the pressure of oil supplied to the chambers in accordance with a desired line pressure, the spool is shifted, so that the line pressure is controlled.

3 Claims, 8 Drawing Figures (a)

(b)

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a hydraulic circuit including a pump, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

Japanese Patent Laid Open No. 57-161347 discloses a system for controlling the line pressure in proportion to the output torque of an engine. In the system, when a throttle valve of an engine is closed, the line pressure is kept at a sufficient value to hold the belt on pulleys so as to provide engine-braking effect at deceleration of a vehicle. Generally, the clutch is automatically disengaged when the speed of the vehicle decreases below a predetermined value in order to prevent the stall of the engine. Even if the clutch is disengaged, the line pressure is kept at a proper value in order to ensure the rapid response of the transmission to re-acceleration of the vehicle in accordance with depression of an accelerator pedal. After the disengagement of the clutch, braking force of Tf×n (where Tf is friction torque between the belt and pulleys, and n is total reduction ratio of the transmission) exerts on the vehicle. The friction torque Tf is proportional to the line pressure. Accordingly, comparatively large braking force exerts on the vehicle body, dependent on the line pressure after the disengagement of the clutch, which causes fore-and-aft vibration and pitching of the vehicle body.

SUMMARY OF THE INVENTION

The object of the present invention is to provide a system for controlling the line pressure in accordance with engine torque and transmission ratio, wherein when a clutch is disengaged, the line pressure is reduced to a minimum value necessary to drive a drive pulley of a belt-drive automatic transmission.

According to the present invention, therein provided a control system for a continuously variable transmission for transmitting the power of an internal combustion engine to driving wheels through a clutch. The transmission has a drive pulley having a hydraulically shiftable disc and a first hydraulic cylinder for shifting the disc, a driven pulley having a hydraulically shiftable disc and a second hydraulic cylinder for operating the disc, a belt engaged with both pulleys, line pressure control valve having ports and a spool, a transmission ratio control valve having ports and a spool, a first hydraulic circuit having a pump for supplying oil to the first cylinder through the line pressure control valve and transmission ratio control valve. The system comprises a second hydraulic circuit for supplying oil to the line pressure control valve so as to shift the spool, control valve means provided in the second hydraulic circuit for controlling the amount of oil supplied to the line pressure control valve, first means for detecting a large transmission ratio state after disengagement of the clutch and for producing a signal, second means responsive to the signal from the first means for producing a line pressure reducing signal, third means responsive to the line pressure reducing signal for operating the control valve means, so that the spool of the line pressure control valve is shifted to reduce the line pressure.

In an aspect of the invention, the control valve means is a solenoid operated on-off valve, and the line pressure reducing signal is pulses the duty ratio of which is changed so as to reduce the line pressure.

The other objects and features of this invention will be apparently understood from the following description with reference to the accompanying drawings.

DETAILED DESCRIPTION OF THE PREFERRED EMBODIMENT

Figure 1:
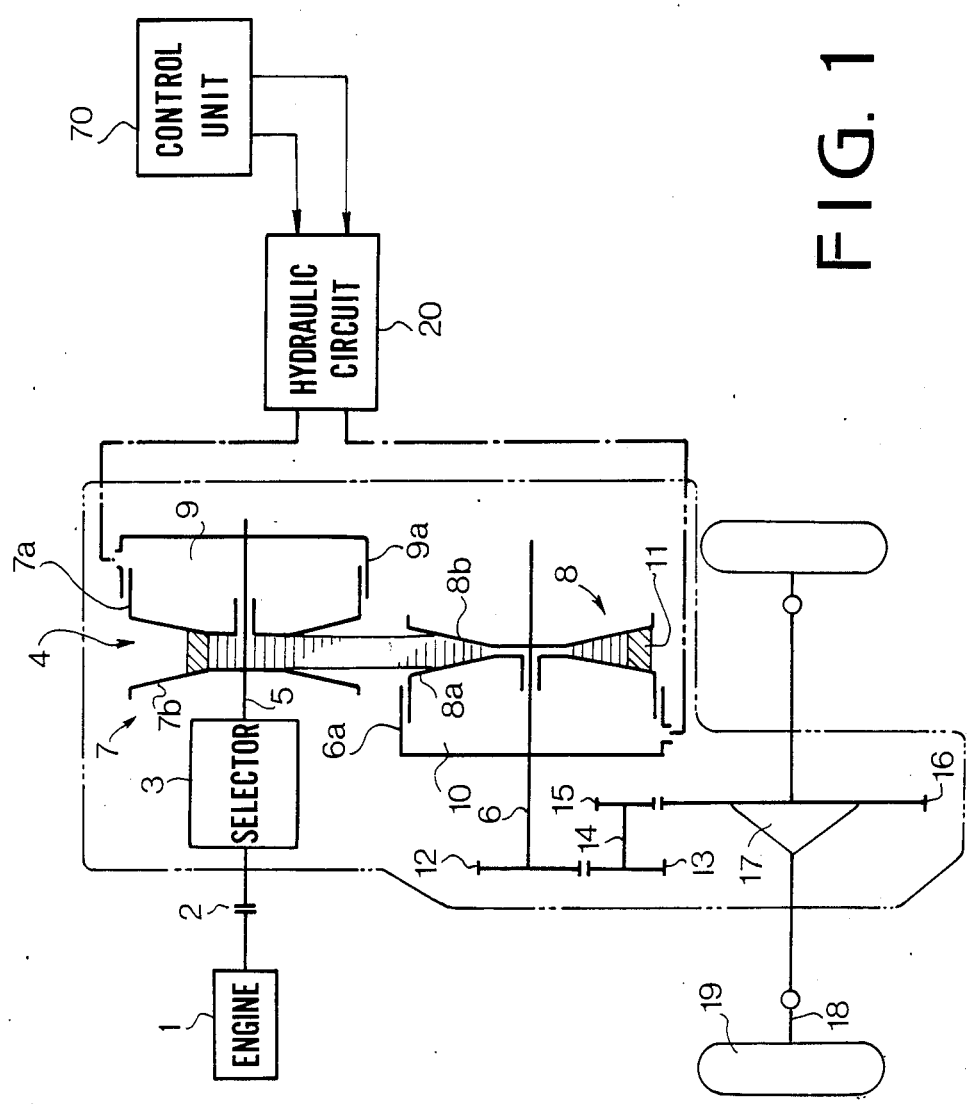
FIG. 1 is a schematic illustration of a continuously variable belt-drive transmission.

Referring to FIG. 1, the continuously variable belt-drive automatic transmission for a motor vehicle to which the present invention is applied, comprises an electromagnetic powder clutch 2 for transmitting the power of an engine 1 to transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a has a cylindrical portion which is slidably engaged in a cylinder 6a of the output shaft 6 to form a servo device. A chamber 10 of the servo device is also communicated with hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of the vehicle driving wheels 19 through a differential 17.

Figure 2A:
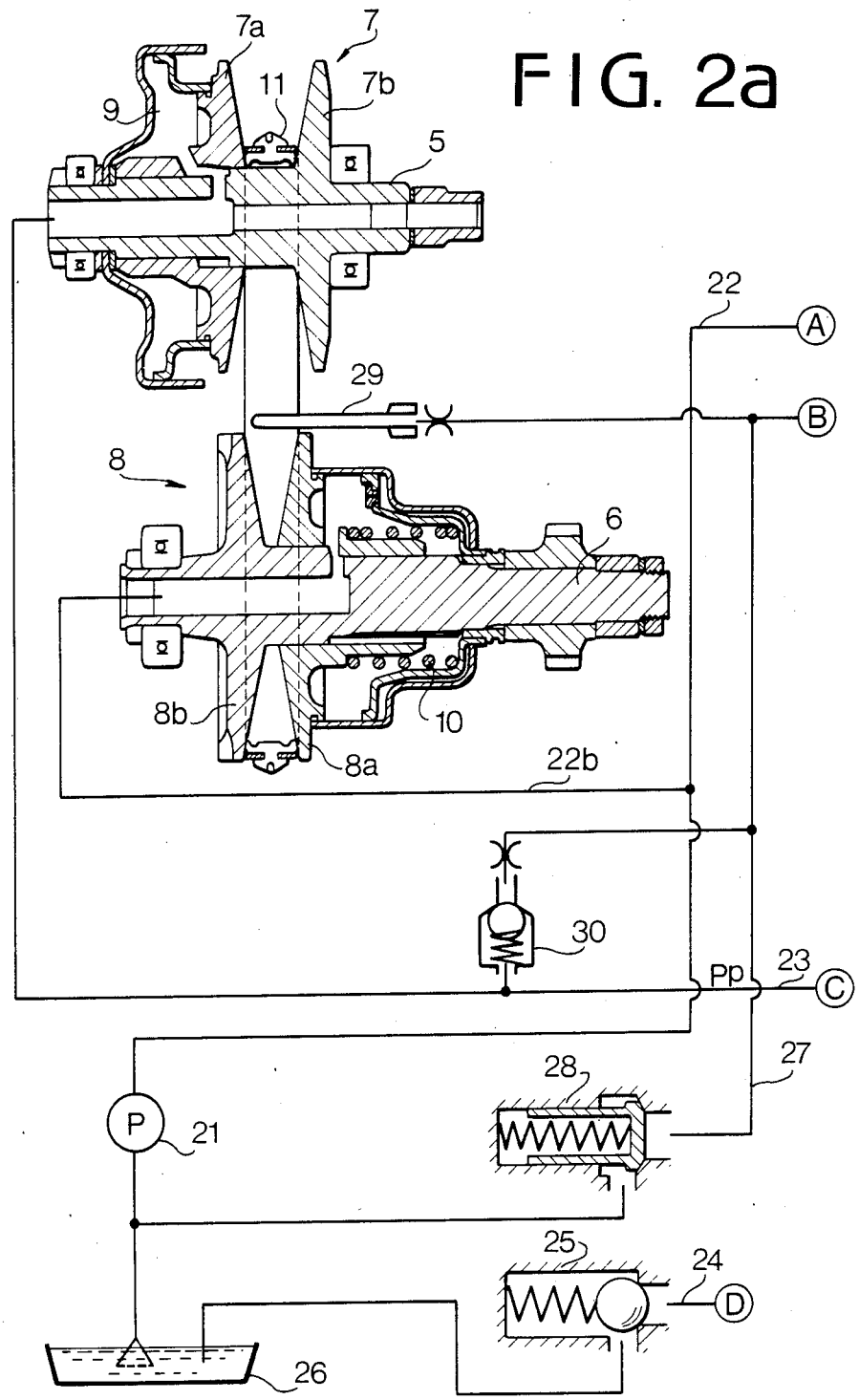
FIGS. 2a to 2c are schematic diagrams showing a control system according to present invention.
Figure 2B:
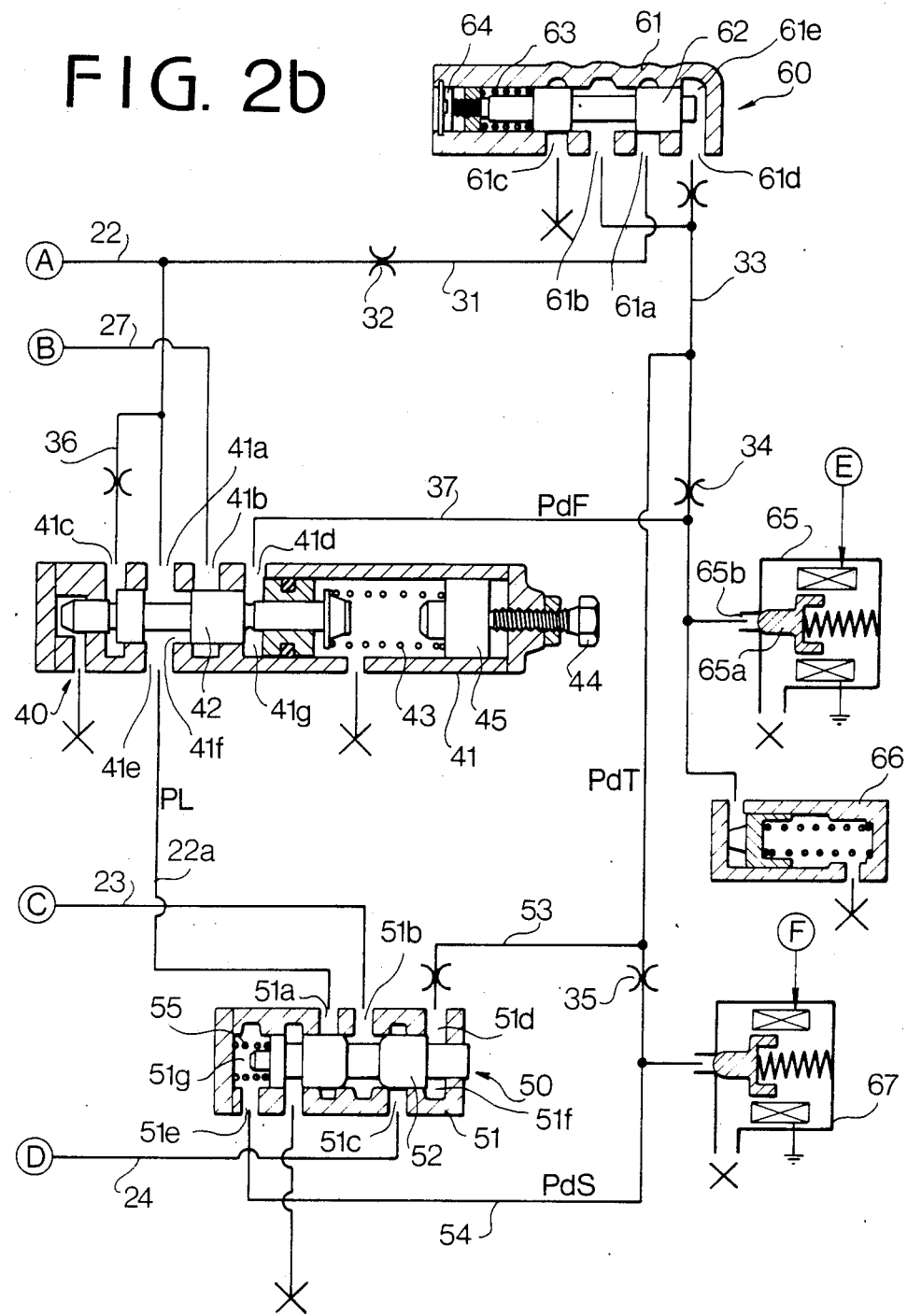
Figure 2C:
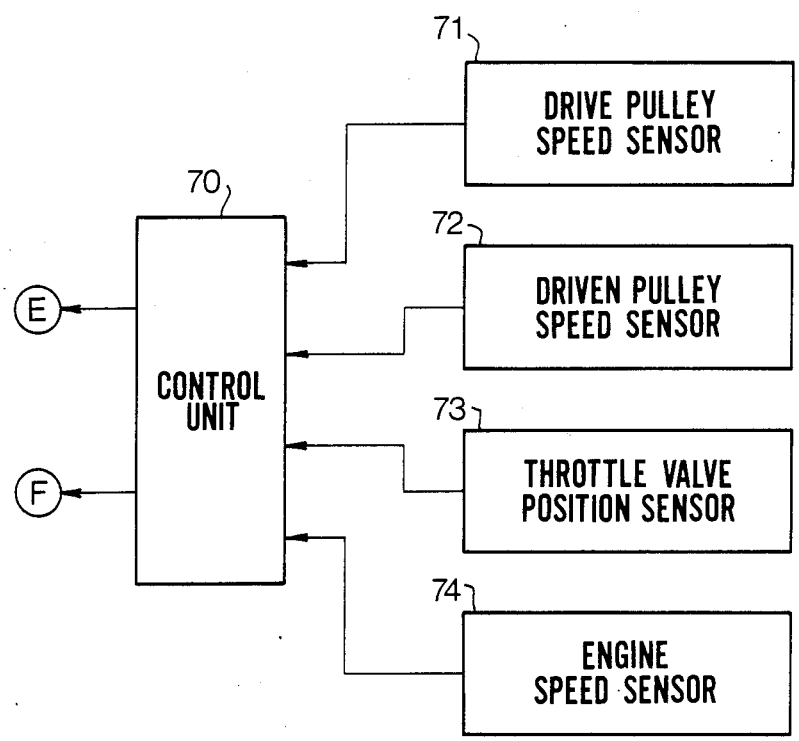

Referring to FIGS. 2a to 2c, the hydraulic control circuit 20 includes a line pressure control valve 40 and a transmission ratio control valve 50. The line pressure control valve 40 comprises a valve body 41, spool 42, and ports 41a, 41b, 41c, 41d, 41e and chambers 41f and 41g. The chamber 9 of the drive pulley 7 is applied with pressurized oil by an oil pump 21 from an oil reservoir 26 passing through a line pressure conduit 22, ports 41a and 41e of line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The spool 42 is applied with pressurized oil supplied to a chamber communicating with port 41c through a conduit 46. The spool 42 is urged to the left by the force of a spring 43 provided between the end of the spool and a retainer 45 the position of which is adjustable by a screw 44. The port 41a is communicated with port 41b of a drain passage 27 in accordance with the position of a land of the spool 42.

The transmission ratio control valve 50 comprises a valve body 51, spool 52, spring 55 for urging the spool in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with line pressure control valve 40 through conduit 22a. The drain port 51c is communicated with the oil reservoir 26 through a conduit 24 and check valve 25. The drain port 41b of the line pressure control valve communicates with oil reservoir 26 through passage 27 and a lubricating oil pressure providing valve 28 in the form of a check valve. The passage 27 is further communicated with conduit 23 through a check valve 30. A part of the oil in the conduit 27 is supplied to the pulley 8 and to belt 11 from a nozzle 29 to lubricate the pulley device.

The system of the present invention is provided with a pressure reducing valve 60, solenoid operated on-off control valves 65 and 67. The pressure reducing valve 60 comprises a valve body 61, spool 62, inlet port 61a basic pressure port 61b, drain port 61c, end chamber port 61d, spring 63 urging the spool 62 to a chamber 61e. The basic pressure port 61b is positioned between the inlet port 61a and drain port 61c, and the spring 63 is positioned opposite the end chamber 61e against the regulator pressure. The load of the spring 63 can be adjusted by an adjust screw 64. The port 61a is connected to the pump 21 through a conduit 31 having an orifice 32 and conduit 22, and ports 61b and 61d are connected to a conduit 33. When the pressure in the conduit 33 reduces, the spool 62 is shifted to the right by spring 63, so that port 61a communicates with port 61b to increase the pressure in the conduit 33. Thus, a constant basic pressure of oil which is lower than the line pressure is provided in the conduit 33.

The conduit 33 is communicated with the port 41d of line pressure control valve 40 through an orifice 34 and a passage 47. The conduit 33 is also communicated with reservoir 26 through solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 at the downstream of orifice 35 so as to drain the oil in the chamber of the drive pulley to the reservoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, control pressures applied to ports 41d, 51e are changed by changing duty ratios of pulses supplied to the control valves 65 and 67.

In the line pressure control valve 40, the relationship among spring load $F_S$ and line pressure PL, line pressure receiving area SL of the spool, first control pressure $P_d F$ at the port 41d, and control pressure receiving area $S_d$ is as follows:

$$F_S + P_d F \cdot S_d = PL \cdot SL$$

$$PL = (P_d F \cdot S_d + F_s)/SL$$

Accordingly, the line pressure PL is proportional to the control pressure $P_d F$.

In the transmission ratio control valve, pressure receiving area of the spool 52 at chamber 51g is set to a value larger than the area at the chamber 51f. On the other hand, second control pressure $P_d S$ in the chamber 51g can be changed between a maximum value, which is the same as third control pressure $P_d T$ in the chamber 51f when the duty ratio of pulses supplied to control valve 67 is 0%, and a minimum value by controlling the duty ratio of pulses for operating the control valve 67. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51g. Further, the speed of the movement of the spool increases with decreasing of the duty ratio. The spool 52 is shifted to an oil drain position by decreasing the duty ratio. It will be understood that when the oil is supplied to the chamber 9, the transmission is upshifted.

The relationship between the duty ratio D of pulses applied to the solenoid operated control valve 67 and the transmission ratio i is explained hereinafter.

The transmission ratio changing speed di/dt is a function of flow rate Q of oil supplied to the chamber 9, and the flow rate Q is a function of duty ratio D, line pressure PL and primary pressure $P_p$ in the chamber 9, namely:

$$di/dt = F(Q) = F(D, PL, P_p)$$

The line pressure PL is decided by the transmission ratio i and engine torque, and the primary pressure $P_p$ in the chamber 9 is decided by the transmission ratio i and the line pressure PL. Accordingly, assuming the engine torque to be constant, $$di/dt = f(D, i)$$

$$D = f(di/dt, i)$$

Accordingly, the duty ratio is decided by the transmission ratio changing speed di/dt and the transmission ratio i. On the other hand, the transmission ratio changing speed di/dt is dependent on the difference between the actual transmission ratio i and a desired transmission ratio id, $$di/dt = K(id - i)$$

where K is a coefficient.

Accordingly, if the transmission ratio changing speed di/dt is decided, the duty ratio D can be obtained from the speed. When the actual transmission ratio i is larger than the desired transmission ratio id (i>id), the value of di/dt is negative. In such a state, the duty ratio D is increased to reduce the pressure in the chamber 51g so as to upshift the transmission. The downshift is performed in the reverse manner.

Figure 3A:
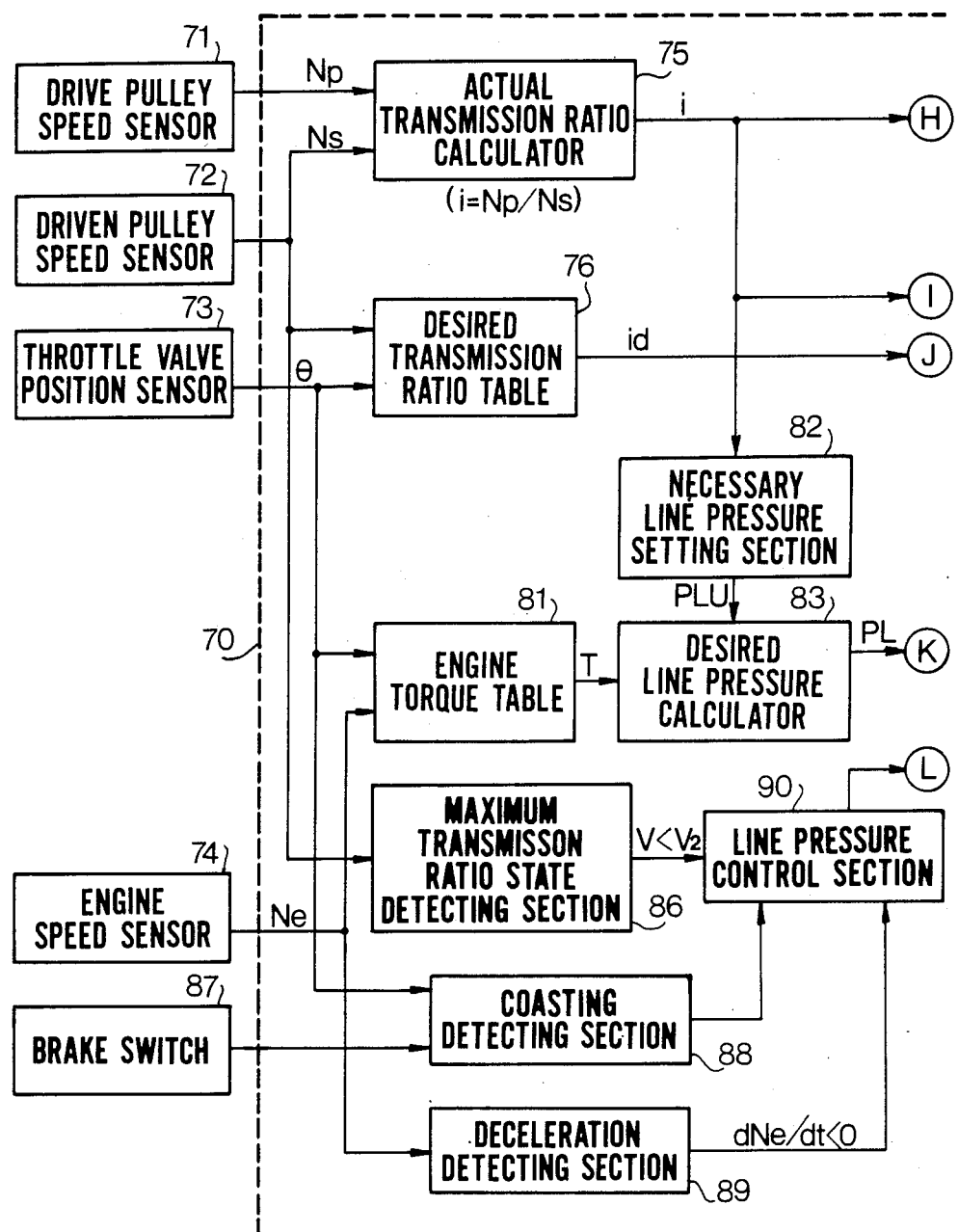
FIGS. 3a and 3b are block diagrams of a control unit used in the system.
Figure 3B:
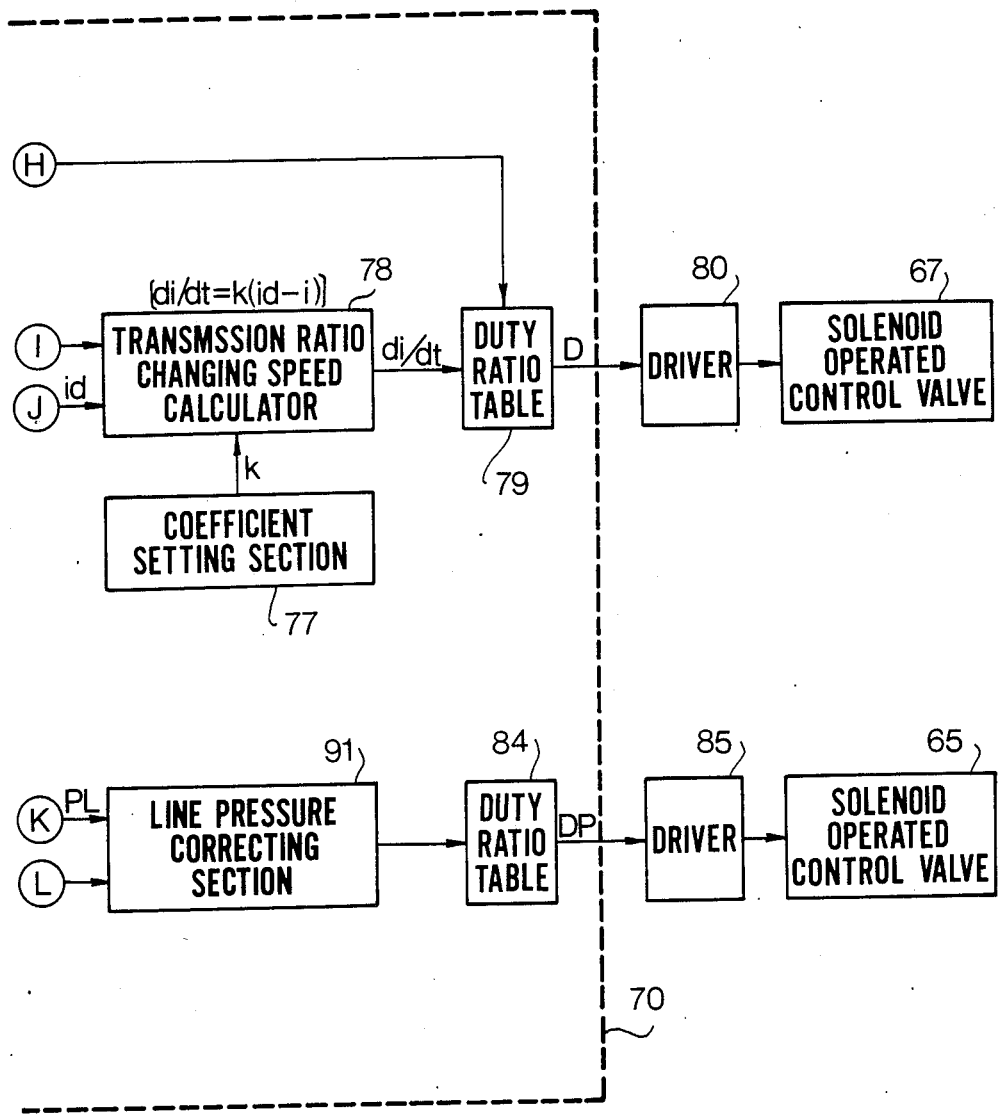

Referring to FIGS. 3a and 3b, the system is provided with a drive pulley speed sensor 71, driven pulley speed sensor 72, throttle valve position sensor 73, engine speed sensor 74 and brake switch 87. Output signals $N_p$ and $N_s$ of sensors 71 and 72 are fed to an actual transmission ratio calculator 75 in the control unit 70 to produce an actual transmission ratio i in accordance with $i = N_p/N_s$. The output signals $N_s$ of the sensor 72 and the output signal $\theta$ of the throttle valve position sensor 73 are fed to a desired transmission ratio table 76. The desired transmission ratio id is fetched from the table in accordance with the signals $N_s$ and $\theta$. The actual ratio i, desired ratio id and coefficient K from a coefficient setting section 77 are applied to a transmission ratio changing speed calculator 78 to produce a transmission ratio changing speed di/dt from the formula di/dt=-K(id−i).

The speed di/dt and actual ratio i are applied to a duty ratio table 79 to derive the duty ratio D of pulses for control valve 67. The duty ratio in the table 79 decreases with increases of speed di/dt and ratio i. The duty ratio D is supplied to the solenoid operated valve 67 through a driver 80.

On the other hand, an output signal Ne of the engine speed sensor 74 and throttle position signal $\theta$ are fed to an engine torque table 81 to derive engine torque T. On the other hand, actual ratio i is applied to a necessary line pressure setting section 82 which produces a necessary line pressure $PL_u$ from a graph. The necessary line pressure $PL_u$ and engine torque T are fed to a desired line pressure calculator 83 to produce desired line pressure PL dependent on PL=PLu×T. The desired line pressure PL is applied to a duty ratio setting section 84 through a line pressure correcting section 91 to produce a duty ratio DP dependent on the desired line pressure. The duty ratio DP is applied to the solenoid operated valve 65 through a driver 85.

Figure 4:
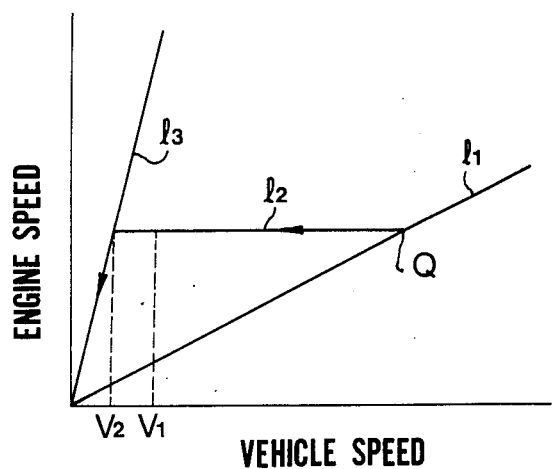
FIG. 4a is a graph showing relationships between vehicle speed and engine speed.
FIG. 4b is a graph showing relationship between transmission ratio and line pressure.
Figure 4:
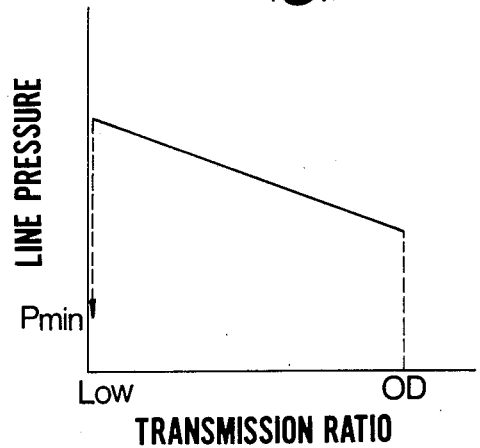

FIG. 4a shows relationship between vehicle speed and engine speed, which also shows a changing mode of transmission ratio of the automatic transmission. When the vehicle is decelerated at a minimum transmission ratio, the vehicle speed decreases along a minimum transmission changing line $l_1$. After the vehicle speed passes a point Q, the vehicle speed reduces along a transmission ratio reducing line $l_2$, while the engine speed is kept constant. When the vehicle speed reaches a set low value $V_1$, the clutch 2 is disengaged. Thereafter, the vehicle speed reaches a maximum transmission ratio line $l_3$ at a speed $V_2$.

The system of the present invention is adapted to detect whether the vehicle is in coasting state after disengagement of the clutch and vehicle speed reaches the speed $V_2$ for the maximum transmission ratio. To detect such states, the output signal Ns of the driven pulley speed sensor 71, which corresponds to the vehicle speed at the maximum transmission ratio is used.

The signal Ns is supplied to a maximum transmission ratio state detecting section 86. Further, the output signal $\theta$ of throttle valve position sensor 73 and the output signal of the brake switch 87 are applied to a coasting detecting section 88 which produces an output signal as a coasting state, when the throttle valve is closed and a brake pedal of the vehicle is not depressed. The output signal Ne of engine speed sensor 74 is supplied to a deceleration detecting section 89 which produces an output signal when the vehicle is decelerated (dNe/dt<0). Output signals of sections 86, 88 and 89 are fed to a line pressure control section 90 which produces a line pressure correcting signal in accordance with the input signals. The correcting signal is supplied to the line pressure correcting section 91. The correcting section 91 operates to reduce the maximum line pressure for the maximum transmission ratio to a minimum line pressure Pmin as shown in FIG. 4b. The minimum line pressure Pmin is a minimum value sufficient to keep the engagement of the belt with the drive pulley 9 to drive it at the maximum transmission ratio for a period. The period is preferably decided in accordance with vehicle speed at that time.

In operation, while the vehicle is at a stop, chamber 10 of the driven pulley is supplied with line pressure through conduit 22b, and the chamber 9 of the drive pulley is drained, since the signals $N_p$, $N_s$, $\theta$ are zero and duty ratio is zero, so that the spool 52 is at the right end position and the drain port 51c communicates with the chamber 9 through the conduit 23. Thus, in the pulley and belt device of the continuously variable belt-drive transmission, the driving belt 11 engages with the driven pulley 8 at a maximum running diameter to provide the maximum transmission ratio (low speed stage). When the accelerator pedal is depressed, the electromagnetic clutch 2 is gradually engaged, transmitting the engine power to the drive pulley 7. The power of the engine is transmitted to the output shaft 6 at the maximum transmission ratio by the driving belt 11 and driven pulley 8, and further transmitted to axles of the driving wheels 19. Thus, the vehicle is started.

At that time the line pressure is at the highest value by the pressure control valve 40, since the duty ratio D for the valve 65 is small, and the spool 42 of the control valve 40 is at the left end position. When the throttle valve is opened for acceleration, the desired transmission ratio id and transmission ratio changing speed di/dt are calculated by calculators 76, 78, and duty ratio D is obtained from the table 79. The value of the duty ratio D is larger than the neutral value, so that the pressure in the chamber 51f of the control valve 50 is higher than the chamber 51g. Thus, the spool 52 is shifted to the left to communicate the port 51a with port 51b, so that oil is supplied to the chamber 9 through the conduit 23. On the other hand, duty ratio DP for the control valve 65 is increased, so that the pressure in the chamber 41g becomes low to shift the spool 42 of the valve 40 to the right. Accordingly, the port 41a communicates with the port 41b of the drain passage 27. Thus, line pressure reduces, and the transmission is upshifted, since oil is still supplied to the chamber 9 through the control valve 50. As the difference between the desired ratio id and actual ratio i becomes large, the duty ratio D for the control valve 67 becomes large, thereby increasing the transmission changing speed di/dt. When the opening degree of the throttle valve is reduced for deceleration, the duty ratio D is reduced, thereby shifting the spool 52 to the right to drain the oil in the chamber 9. Thus, the transmission is downshifted. The transmission changing speed at downshifting increases with reducing of the duty ratio.

Figure 5:
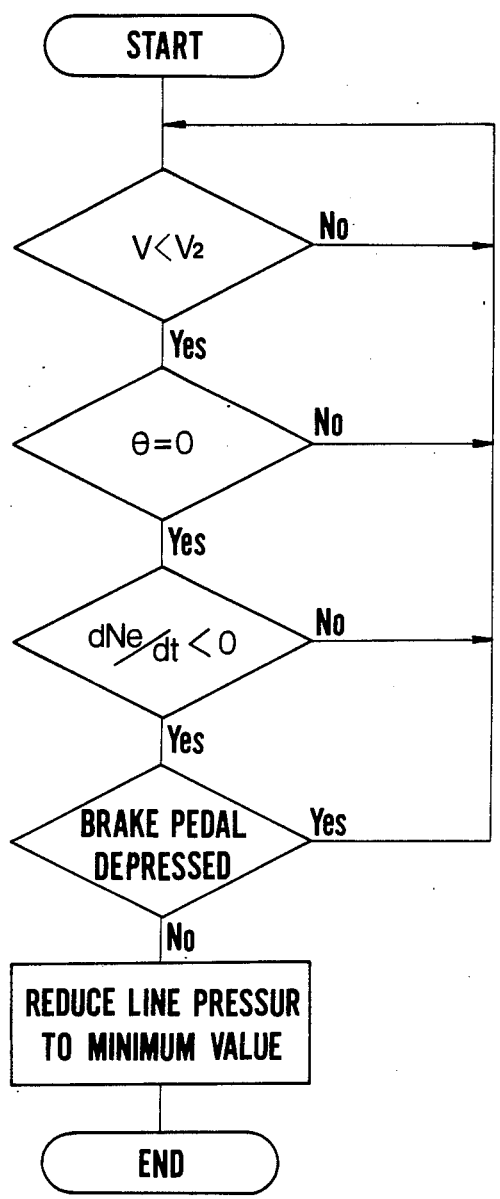
FIG. 5 is a flowchart showing the operation.

When the clutch disengages at the vehicle speed $V_1$, the program of FIG. 5 starts. It is decided whether vehicle speed becomes lower than the speed $V_2$ by the section 86, thereafter, closing of the throttle valve is detected. When the vehicle is decelerated without braking, the line pressure control section 90 produces the correcting signal. The correcting signal is supplied to the line pressure correcting section 91, so that the desired line pressure is reduced. Accordingly, the duty ratio $D_p$ is increased and hence the maximum line pressure is reduced to the minimum pressure Pmin for a period. Thus, the friction torque Tf between the belt and pulleys, which is proportional to the line pressure, is reduced to a necessary minimum value, thereby preventing the braking of the vehicle. Accordingly, pitching and fore-and-aft vibration of the vehicle body can be prevented.

Although the line pressure reducing operation is performed below the vehicle $V_2$ in the above system, the operation may be carried out below the vehicle speed $V_1$ at which the clutch is disengaged.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting the power of an internal combustion engine to driving wheels through a clutch, having a drive pulley having a hydraulically shiftable disc and a first hydraulic cylinder for shifting the disc, a driven pulley having a hydraulically shiftable disc and a second hydraulic cylinder for operating the disc, a belt engaged with both pulleys, a line pressure control valve having ports and a spool, a transmission ratio control valve having ports and a spool, a first hydraulic circuit having a pump for supplying oil to the first cylinder through the line pressure control valve and transmission ratio control valve, the system comprising:

a second hydraulic circuit for supplying oil to the line pressure control valve so as to shift the spool;

control valve means provided in the second hydraulic circuit for controlling amount of oil supplied to the line pressure control valve;

first means for detecting a large transmission ratio state after disengagement of the clutch and for producing a signal;

second means responsive to the signal from the first means for producing a line pressure reducing signal;

third means responsive to the line pressure reducing signal for operating the control valve means, so that the spool of the line pressure control valve is shifted to reduce the line pressure.

2. The control system according to claim 1 wherein the control valve means is a solenoid operated on-off valve, and the line pressure reducing signal is pulses the duty ratio of which is changed so as to reduce the line pressure.

3. The control system according to claim 1 wherein the second hydraulic circuit is provided with a pressure control valve for maintaining the pressure of oil at a constant value.

* * * * *